United States Patent
Jeon et al.

(10) Patent No.: US 10,905,988 B2
(45) Date of Patent: Feb. 2, 2021

(54) PURIFICATION DEVICE

(71) Applicant: LG ELECTRONICS INC., Seoul (KR)

(72) Inventors: Jewook Jeon, Seoul (KR); Youngseok Kim, Seoul (KR); Minho Kim, Seoul (KR); Hoon Jang, Seoul (KR); Soonki Jung, Seoul (KR); Jingyu Ji, Seoul (KR)

(73) Assignee: LG ELECTRONICS INC., Seoul (KR)

(*) Notice: Subject to any disclaimer, the term of this patent is extended or adjusted under 35 U.S.C. 154(b) by 156 days.

(21) Appl. No.: 16/114,827

(22) Filed: Aug. 28, 2018

(65) Prior Publication Data

US 2019/0060807 A1    Feb. 28, 2019

(30) Foreign Application Priority Data

Aug. 30, 2017    (KR) .................. 10-2017-0110413

(51) Int. Cl.
*B01D 35/30*    (2006.01)
*C02F 1/00*    (2006.01)
(Continued)

(52) U.S. Cl.
CPC .......... *B01D 35/303* (2013.01); *B01D 35/04* (2013.01); *B01D 35/18* (2013.01); *C02F 1/003* (2013.01);
(Continued)

(58) Field of Classification Search
CPC .... B01D 2201/0415; B01D 2201/0423; B01D 2201/301; B01D 35/04; B01D 35/18;
(Continued)

(56) References Cited

U.S. PATENT DOCUMENTS 3,985,272 A     10/1976 Rodth
2007/0017376 A1* 1/2007 Oehninger .......... A47J 31/4482
                                                            99/279

(Continued)

FOREIGN PATENT DOCUMENTS

AU    2017423559    2/2019
AU    2018220139    3/2019
(Continued)

OTHER PUBLICATIONS

Korean Office Action dated Jul. 20, 2018 issued in KR Application No. 10-2017-0110412.
(Continued)

*Primary Examiner* — Dirk R Bass
(74) *Attorney, Agent, or Firm* — Ked & Associates, LLP

(57) ABSTRACT

The present disclosure provides a purification device comprising: a main body, and a water-outlet module, wherein the module includes a fixed cover fixed to the main body so as to protrude forward of the main body, a vertically-movable cover moving vertically while bearing against the fixed cover, and a water-outlet nozzle mounted on a bottom of the vertically-movable cover, wherein the vertically-movable cover or the fixed cover includes a removable cover configured to be removable in a direction crossing a vertical movement direction of the vertically-movable cover.

16 Claims, 11 Drawing Sheets

(51) Int. Cl.
*B01D 35/04* (2006.01)
*B01D 35/18* (2006.01)

(52) U.S. Cl.
CPC ............ *B01D 2201/0415* (2013.01); *B01D 2201/301* (2013.01); *C02F 2201/004* (2013.01); *C02F 2201/005* (2013.01); *C02F 2201/007* (2013.01)

(58) Field of Classification Search
CPC .. B01D 35/303; C02F 1/003; C02F 2201/004; C02F 2201/005; C02F 2201/007
See application file for complete search history.

(56) References Cited

U.S. PATENT DOCUMENTS

| | | |
|---|---|---|
| 2014/0251498 A1 | 9/2014 | Park et al. |
| 2017/0050836 A1 | 2/2017 | Yoon |
| 2017/0153056 A1 | 6/2017 | Kim et al. |
| 2019/0060803 A1 | 2/2019 | Jeon et al. |

FOREIGN PATENT DOCUMENTS

| | | | |
|---|---|---|---|
| DE | 29810291 U1 * | 9/1998 | .......... A47J 31/4482 |
| JP | 2008-168237 | 7/2008 | |
| KR | 10-0650666 | 11/2006 | |
| KR | 10-2007-0115097 | 12/2007 | |
| KR | 10-2010-0054580 | 5/2010 | |
| KR | 10-1338670 | 12/2013 | |
| KR | 10-1381803 | 4/2014 | |
| KR | 10-2015-0004669 | 1/2015 | |
| KR | 10-2017-0063454 | 6/2017 | |

OTHER PUBLICATIONS

Korean Office Action dated Jul. 20, 2018 issued in KR Application No. 10-2017-0107574.
Korean Office Action dated Jul. 20, 2018 issued in KR Application No. 10-2017-0108888.
Korean Office Action dated Apr. 26, 2019 issued in KR Application No. 10-2017-0110413.
Korean Office Action dated Oct. 10, 2019 issued in KR Application No. 10-2019-0089180.
Australian Office Action dated May 3, 2019 issued in AU Application No. 2018222909.
U.S. Appl. No. 16/114,767, filed Aug. 28, 2018.
U.S. Appl. No. 16/110,252, filed Aug. 23, 2018.
U.S. Appl. No. 16/114,827, filed Aug. 28, 2018.
U.S. Appl. No. 16/114,915, filed Aug. 28, 2018.
U.S. Appl. No. 16/114,709, filed Aug. 28, 2018.
United States Office Action dated Mar. 30, 2020 issued in U.S. Appl. No. 16/114,709.
United States Office Action dated Apr. 13, 2020 issued in U.S. Appl. No. 16/114,915.

* cited by examiner

PURIFICATION DEVICE

CROSS-REFERENCE TO RELATED APPLICATIONS

This application claims priority under 35 U.S.C. §119 to Korean Patent Application No. 10-2017-0110413 filed on Aug. 30, 2017, whose entire disclosure is hereby incorporated by reference. This application is related to U.S. application Ser. No. 16/114,767, filed Aug. 28, 2018, U.S. application Ser. No. 16/110,252, filed Aug. 23, 2018, U.S. application Ser. No. 16/114,915, and U.S. application Ser. No. 16/114,709, filed Aug. 28, 2018 whose disclosures are also incorporated by reference.

BACKGROUND

1. Field

The present disclosure relates to a purification device.

2. Background

Generally, a purification device filters water to remove impurities therefrom and is widely used in the home. Specifically, the purification device may be connected to a tap water supply and may remove floating or harmful components contained in tap water using a filter. The purification device may be configured to discharge a desired amount of water by manipulation of a user.

Nowadays, a variety of the above-described purification devices having water purification function and discharge function of hot water and cold water are being introduced. In recent years, the purification device has been developed which may be small and thus installed in various installation environment.

BRIEF DESCRIPTION OF THE DRAWINGS

The embodiments will be described in detail with reference to the following drawings in which like reference numerals refer to like elements wherein.

DETAILED DESCRIPTION

Examples of various embodiments are illustrated and described further below. It will be understood that the description herein is not intended to limit the claims to the specific embodiments described. On the contrary, it is intended to cover alternatives, modifications, and equivalents as may be included within the spirit and scope of the present disclosure as defined by the appended claims.

For simplicity and clarity of illustration, elements in the figures are not necessarily drawn to scale. The same reference numbers in different figures denote the same or similar elements, and as such perform similar functionality. Also, descriptions and details of well-known steps and elements are omitted for simplicity of the description. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Figure 1:
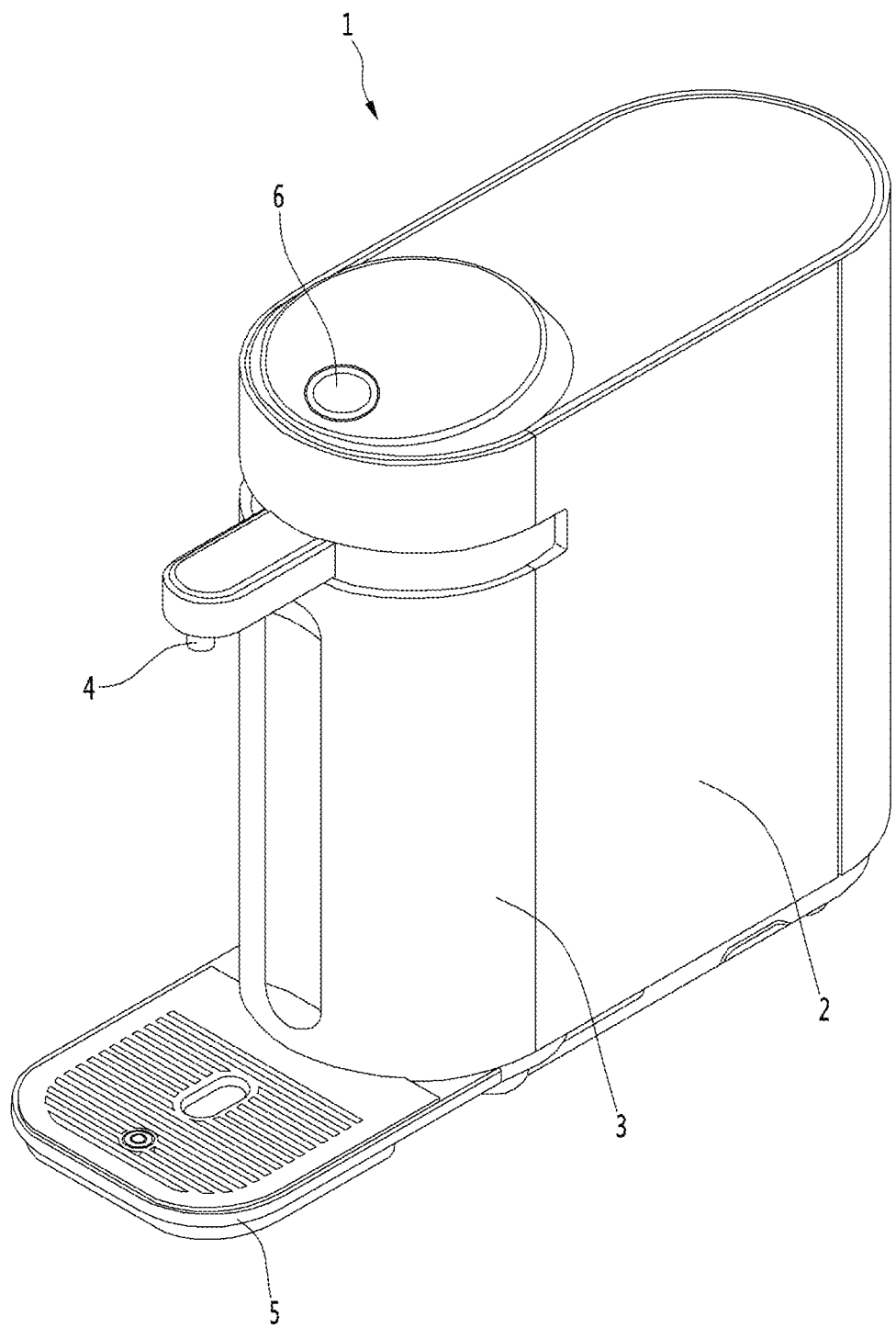
FIG. 1 is a perspective view showing one example of a conventional purification device.

FIG. 1 shows a purification device 1. The purification device 1 includes a cabinet 2 and a dispenser 3 both defining the appearance of the device. In this connection, the dispenser 3 means the space where the user is supplied with edible water. Thus, in general, the dispenser 3 is formed in front of the cabinet 2. In addition, the dispenser 3 is provided with a water-outlet nozzle 4 through which edible water is discharged. Below the water-outlet nozzle 4, a tray 5 on which a water cup is placed is formed.

In this state, when the user manipulates a lever or button 6, the stored water may be discharged through the water-outlet nozzle 4. That is, when the user manipulates the lever or button 6, a valve of the water-outlet nozzle 4 is opened, and, thus, the water is discharged. The user finishes the manipulation of the lever or button 6 while checking the amount of water as filled in the cup or container. In purification device 1, the vertical level of the water-outlet hole, that is, the water-outlet nozzle 4 is constant.

However, in purification device 1 as described above, when a water cup is placed on the tray and water is discharged out, the discharged water falls into the water cup and splashes out of the water cup due to the vertical level difference between the water-outlet hole and the water cup. Particularly, in the case of a water cup having a small height, a greater amount of water may splash out of the water cup.

When the vertical level of the water-outlet hole is lowered, the water cup or water bottle with a larger height may be inserted and received between the tray and the water-outlet hole. As described below, a purification device may be equipped with a vertically-movable cover and a fixed cover to allow adjusting the vertical level of the water-outlet hole and, thus, equipped with the water-outlet nozzle having a vertically moving structure. Furthermore, a purification device may include a detachment structure such that at least a portion of the vertically-movable cover or the fixed cover must be separated when necessary so that maintenance operations including internal inspection and cleaning may proceed smoothly.

Figure 2:
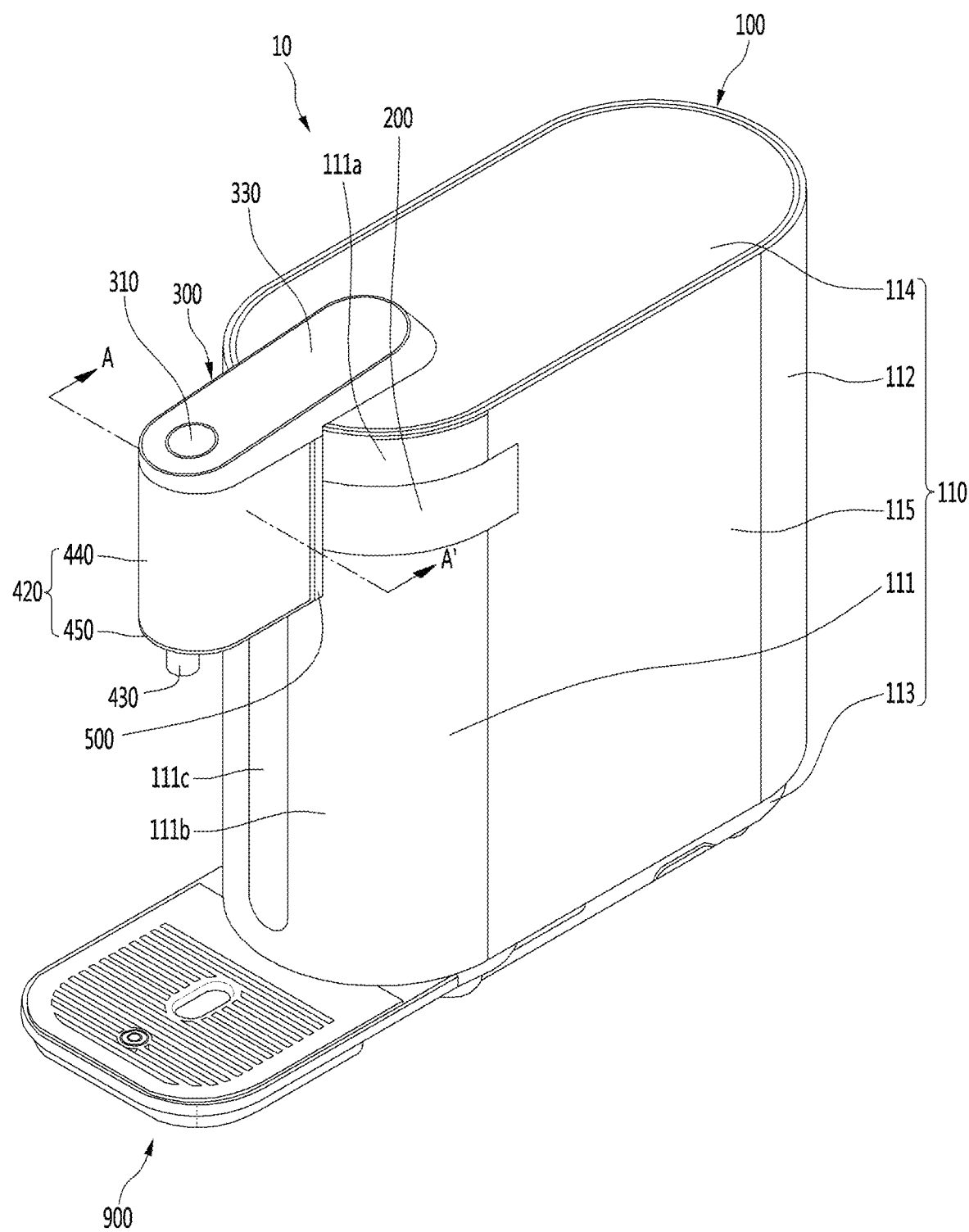
FIG. 2 is a perspective view of a purification device according to one embodiment of the present disclosure.
Figure 3:
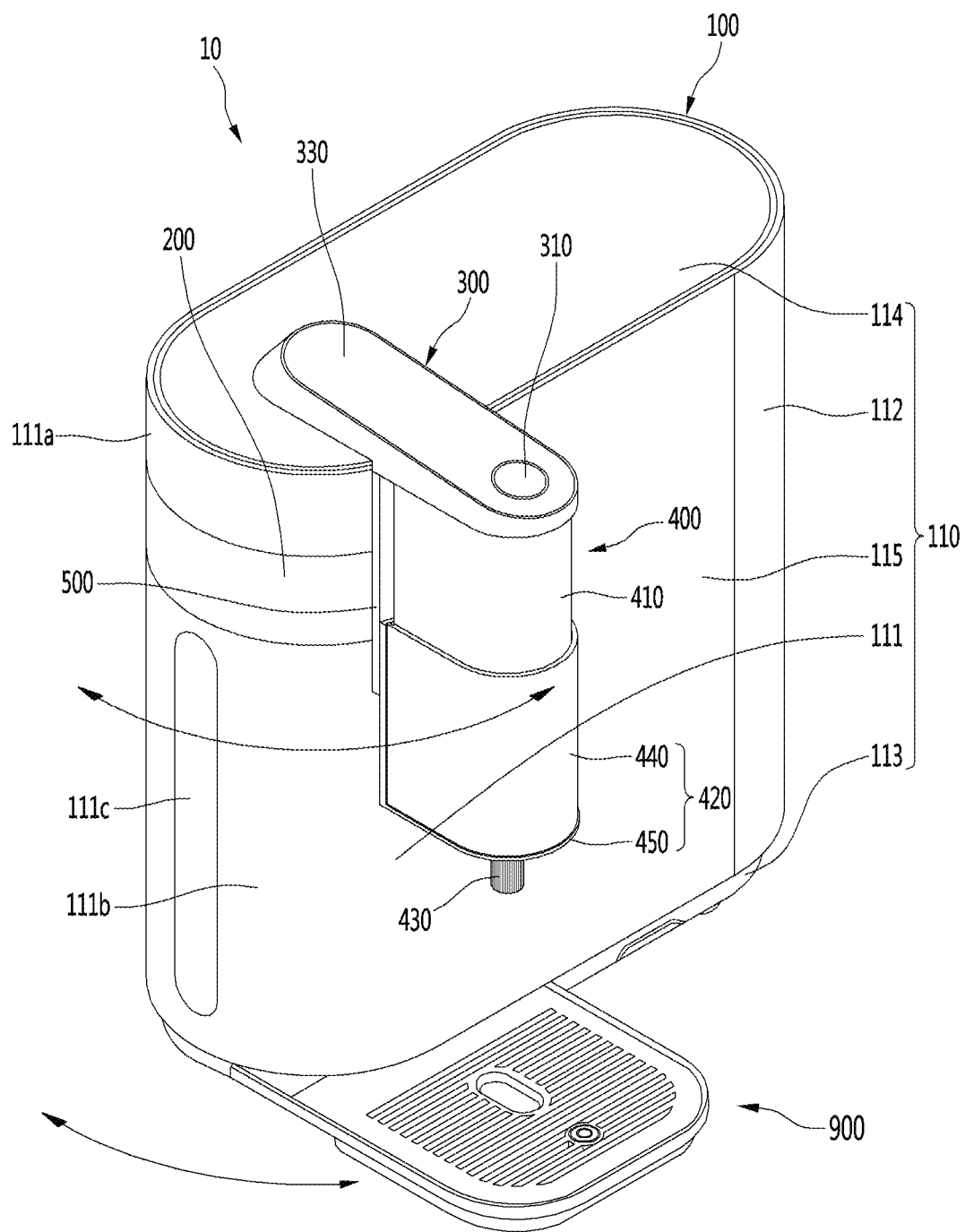
FIG. 3 is a perspective view showing a state in which a position of the water-outlet nozzle of the purification device has been changed according to one embodiment of the present disclosure.

FIG. 2 is a perspective view of a purification device according to one embodiment of the present disclosure. FIG. 3 is a perspective view showing a state in which a position of the water-outlet nozzle of the purification device has been changed according to one embodiment of the present disclosure.

Referring to FIGS. 2 to 3, the purification device according to one embodiment of the present disclosure may include a main body 100 having an opening 101 opened horizontally in a front-face thereof, a rotator 200 received in the opening 101 and rotatably mounted to the main body 100, a manipulation structure (or grip) 300 disposed above the rotator 200 and spaced apart from the rotator, wherein at least a portion of the manipulation structure 300 protrudes forward of the main body 100, and a water-outlet module (or water outlet) 400. The water-outlet module 400 may include a fixed cover (or first cover) 410 fixed to the rotator 200 through the opening 101 and projecting forward of the main body 100 and having a top connected to a bottom of the manipulation structure 300, a vertically-movable cover (or second cover) 420 bearing against the fixed cover 410 and being movable in a vertical direction; and a water-outlet nozzle (or nozzle) 430 mounted on a bottom of the vertically-movable cover 420.

According to the present disclosure, the water-outlet module 400 may be rotated in the left-right direction with respect to the main body 100 by the rotator 200. In addition, the vertically-movable cover 420 and the water-outlet nozzle 430 may be raised or lowered relative to the fixed cover 410 fixed to the rotator 200. Accordingly, the water-discharge nozzle 430 may be displaced in the left-right direction or in the up-down direction.

In addition, the manipulation structure 300 may be rotatably fixed to the top face of the main body 100. A front tip of the manipulation structure 300 may protrude forward of the main body 100 and may be engaged with the top of the water-outlet module 400. Accordingly, when the water-outlet module 400 rotates, the rotator 200 and the manipulation structure 300 connected to the water-outlet module 400 may rotate simultaneously.

In one example, a hollow portion may be formed in the top of the water-outlet module 400. In an inner surface of the module, a protrusion protruding inwardly may be formed. In addition, an inserted portion to be inserted into the hollow portion of the water-outlet module 400 may be formed from the bottom of the manipulation structure 300. A groove may be defined in the outer face of the inserted portion at a position corresponding to the protrusion. Accordingly, when the inserted portion formed from the bottom of the manipulation structure 300 is fitted into the hollow formed in the top of the water-outlet module 400, and the protrusion fits in the groove, the combination of the water-outlet module 400 and the manipulation structure 300 may be achieved.

In one embodiment, the main body 100 has the housing 110 and a filter (not shown). The external appearance of the purification device 10 may be defined by the housing 110. The housing 110 may include a front-cover 111 defining the appearance of the front-face, a rear-cover 112 defining the appearance of the rear-face, a base 113 defining the bottom face, a top-cover defining the top face 114, and left and right side-panels 115 defining both lateral faces. The front-cover 111, the rear-cover 112, the base 113, the top-cover 114 and a pair of the side-panels 115 may be assembled together to define the appearance of the purification device 10.

In this connection, the front end and the rear end of each of the base 113 and the top-cover 114 may be rounded. Thus, each of the front-cover 111 and the rear-cover 112 may be convexly formed forwardly and rearwardly, respectively so as to have a curvature corresponding to a curvature of the front end and the rear end of each of the base 113 and the top-cover 114.

In the housing 110, the filter (not shown) for purifying raw-water introduced from the outside thereto and discharging the purified water is provided. In the front face of the main body 100, the water-outlet module 400 is disposed so as to protrude forward therefrom. The purified water passing through the filter may be discharged through the water-outlet nozzle 430 protruding downward from the bottom of the water-outlet module 400.

In addition, purified water passing through the filter may be cooled or heated and then supplied to the water-outlet nozzle 430 in the state of cold water and hot water. In one embodiment, the front-cover 111 may include an upper cover 111a and a lower cover 111b. Further, the upper cover 111a and the lower cover 111b are vertically spaced from each other, and the opening 101 is defined in the space. The opening 101 may be shielded by the rotator 200 rotatably mounted on the main body 100.

In this connection, the lower cover 111b may have a planar portion 111c extending in a vertical direction at a central portion thereof. When the lower cover 111b has the planar portion 111c, this may allow following advantages compared with the case where the entire area of the lower cover 111b is formed convexly forwardly: when a user discharges water, there is an advantage in that the container including the cup may be positioned to a deeper position. There is also an advantage that the container including the cup, etc. may be stably supported.

In addition, when the water-outlet module 400 is rotated, there is the advantage that the module may be centered with reference to the planar portion 111c. In a state where the water-outlet module 400 is rotated left or right, a container including a cup, etc. may be stably supported from a corresponding side panel 115 having a planar shape.

The water-outlet module 400 may be configured to rotate with the rotator 200. Accordingly, the user may rotate the water-outlet module 400 at a desired angle depending on the installation state of the purification device 10 or the installation environment thereof.

In addition, the manipulation structure 300 rotatably coupled to the top-cover 114 may be integrally coupled to the water-outlet module 400 and thus rotated with the water-outlet module 400. In this connection, a user presses a water-discharge button 310 of the manipulation structure 300. The water-discharge button 310 is preferably positioned vertically overlapping the water-outlet module 400 such that the vertical downward force may be applied to the water-outlet module 400 when the water-discharge button 310 is pressed by the user. That is, when the user presses the water-discharge button 310, the vertical downward force is applied to the water-outlet module 400 such that the water-outlet module 400 does not rotate arbitrarily due to the pressing force from the user.

In addition, while the water-outlet module 400 is fixed to the outside of the rotator 200, the module 400 may be capable of moving in a vertical direction. The above-described rotation and vertical-movement operation of the water-outlet module 400 will be described later.

Figure 4:
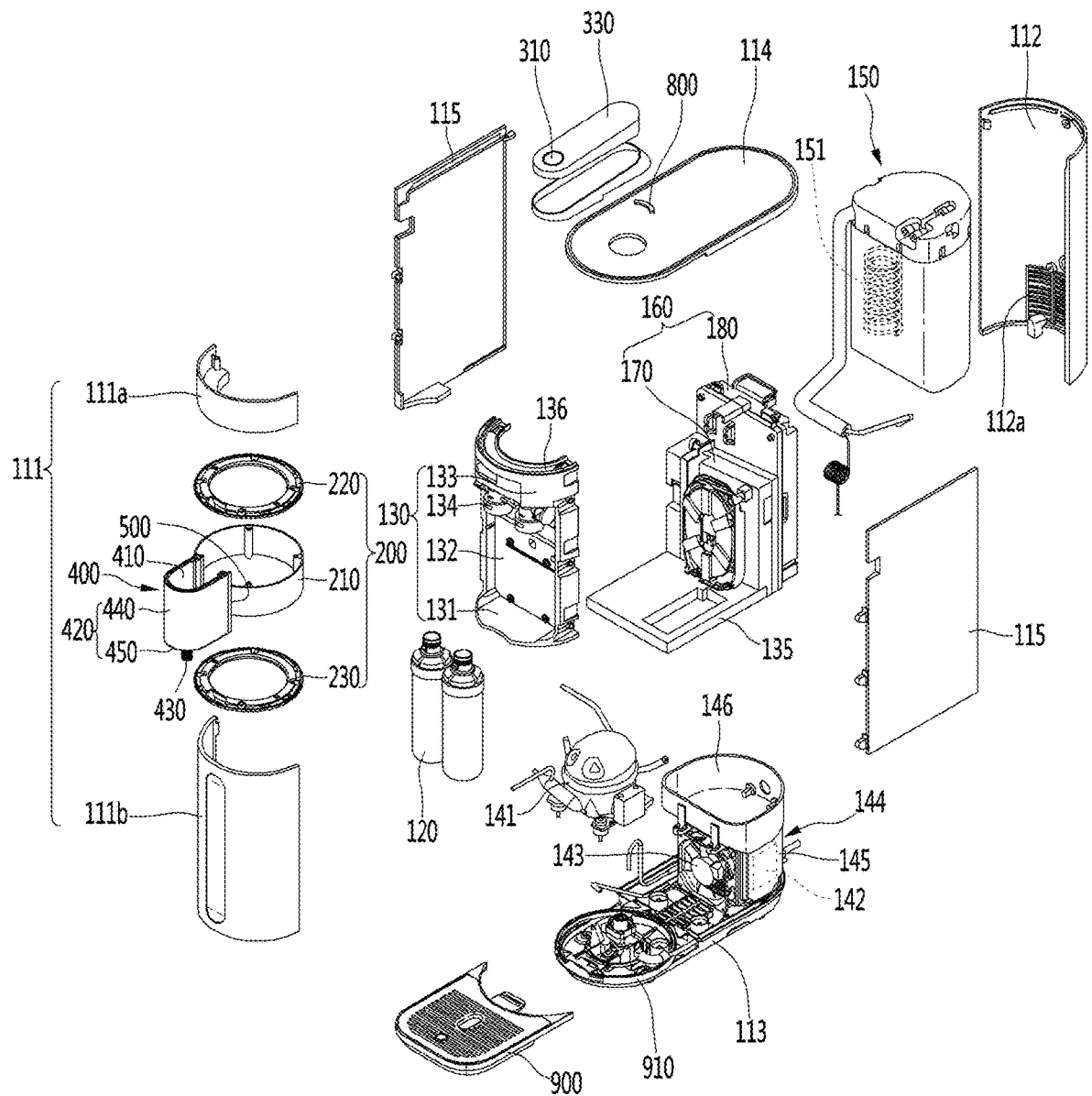
FIG. 4 is an exploded perspective view of the purification device according to one embodiment of the present disclosure.
Figure 5:
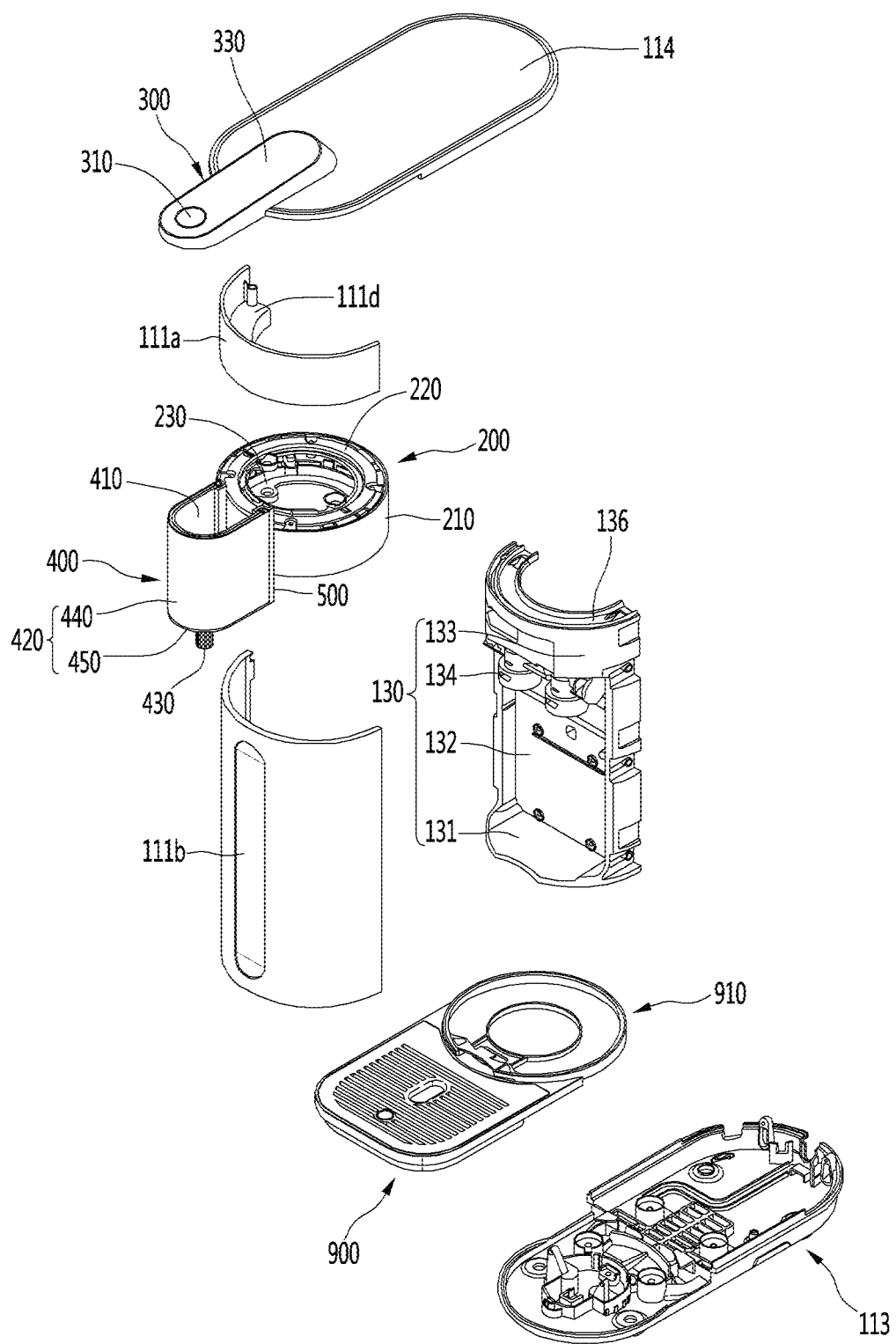
FIG. 5 is an exploded perspective view specifically illustrating a portion of FIG. 4.

FIG. 4 is an exploded perspective view of the purification device according to an embodiment of the present disclosure. FIG. 5 is an exploded perspective view of a portion of FIG. 4. Referring to FIGS. 4 to 5, the housing 110 includes a filter 120 for purification of water and a filter bracket 130 to which a plurality of valves (not shown) are mounted.

The filter bracket 130 may include a bottom portion 131 coupled with the base 113, a filter receiving portion 132 in which the filter 120 is received, and a rotator mount 133 on which the rotator 200 is mounted. The shape of the bottom portion 131 may be formed to correspond to the shape of the tip of the base 113, and the portion 131 may be coupled to the base 113. Thus, the mounting position of the filter bracket 130 may be fixed via the coupling between the bottom portion 131 and the base 113. Further, the bottom face shape of the filter receiving portion 132 may be defined.

The filter bracket 130 may be hooked to the base 113 in a hook manner. The filter bracket 130 may be fixed by a screw fastened to the bottom face of the base 113. The filter receiving portion 132 extends in the vertical direction. The filter receiving portion 132 has a recessed space defined therein from a front side (left side in the figure) to a rear side (right side in the figure) so that the filter 120 may be accommodated therein. A plurality of the filters 120 may be mounted in the filter receiving portion 132. The filter 120 may include a combination of the filters having various functions and may be configured for purifying raw-water (tap water) to be supplied thereto.

Further, the filter receiving portion 132 may further include a filter socket 134 on which the filter 120 is mounted. The filter socket 134 is provided with piping for flowing purified water. The piping may be connected to a plurality of valves (not shown). Thus, the raw-water may pass through the filter 120 in turn and then to a water valve (not shown).

A plurality of valves (not shown) may be provided on the back face (right side in the drawing) of the filter receiving portion 132. The valves (not shown) may supply purified water having passed through the filter 120 to a cooling tank 150 for generating cold water or an induction heating assembly 170 for generating hot water. Furthermore, purified water may be supplied to the water-outlet module 400 immediately.

The rotator mount 133, on which the rotator 200 is rotatably mounted, may be formed on the top of the filter receiving portion 132. In this connection, the rotator mount 133 may be configured to have a curvature corresponding to the curvature of the front cover 111, specifically the lower cover 111b, which covers the front face of the rotator mount 133.

Further, the manipulation structure 300 may be disposed on the water-outlet module 400 connected to the rotator 200 and the rotator 200. In one embodiment, a compressor 113 and a condenser 142 are provided on the top face of the base 113. In addition, a cooling fan 143 is provided between the compressor 141 and the condenser 142 to realize cooling of the compressor 141 and the condenser 142. The compressor 141 may include the compressor of the inverter type capable of adjusting the cooling ability by varying the frequency. Therefore, the cooling of purified water may be efficiently performed, thereby reducing power consumption.

Further, the condenser 142 may be located behind the base 113 and may be located at a position corresponding to a discharge hole 112a defined in the rear-cover 112. The condenser 142 may be realized by bending the flat tube type refrigerant tube many times in order to efficiently utilize the space and at the same time to improve the heat exchange efficiency. The condenser may be configured to be received within the condenser bracket 144.

The condenser bracket 144 may have a condenser mount 145 on which the condenser 142 may be fixed, and a tank mount 146 on which a cooling tank 150 for producing cold water may be mounted. The condenser mount 145 has a space defined therein having a shape corresponding to the overall shape of the condenser 142 so as to accommodate the condenser 142. Further, portions of the condenser mount 145 facing the cooling fan 143 and the discharge hole 112a are opened, respectively, whereby effective cooling of the condenser 142 is possible.

Further, the tank mount 146 is formed on the condenser bracket 144, that is, on the condenser mount 145. The bottom portion of the cooling tank 150 is inserted into the tank mount 146 so that the tank mount 146 fixes the cooling tank 150. The cooling tank 150 may be configured to cool purified water to generate cold water, and, to this end, may be filled with cooling water for heat exchange with the purified water. Further, an evaporator 151 for cooling the cooling water may be accommodated in the cooling tank 150. Further, purified water may pass through the inside of the cooling tank to cool the purified water.

The support bracket 130 is further provided at one side thereof with a support plate 135 extending toward the cooling tank 150. The support plate 135 is provided on the compressor 141. The plate 135 extends from the filter bracket 130 to the condenser bracket 144 to provide a space for receiving the heating and control module 160.

The heating and control module 160 may include an induction heating assembly 170 for generating hot water and a control assembly 180 for controlling the overall operation of the purification device 10. The induction heating assembly 170 and the control assembly 180 may be coupled to each other to form a single module. The induction heating assembly 170 and the control assembly 180 may be mounted on the support plate 135 in the combined state into the single module.

The induction heating assembly 170 is configured to heat purified water and to operate in induction heating (IH) mode. The induction heating assembly 170 may heat the water immediately and rapidly at the time of manipulation for hot water discharge. The heating assembly controls the output of the magnetic field so that purified water may be heated to a target temperature and supplied to a user. Thus, depending on the user's manipulation, the hot water at the target temperature may be discharged.

The control assembly 180 may be configured to control the operation of the purification device 10. The assembly 180 may be configured to control the compressor 141, the cooling fan 143, various valves and sensors, the induction heating assembly 170, and the like. The control assembly 180 may be configured as a module by a combination of PCBs (printed circuit boards) divided into a plurality of functional parts. In addition, when the purification device 10 discharges only cold water and purified water, a PCB for controlling the induction heating assembly 170 may be omitted. In this manner, the at least one PCB may be omitted.

Figure 6:
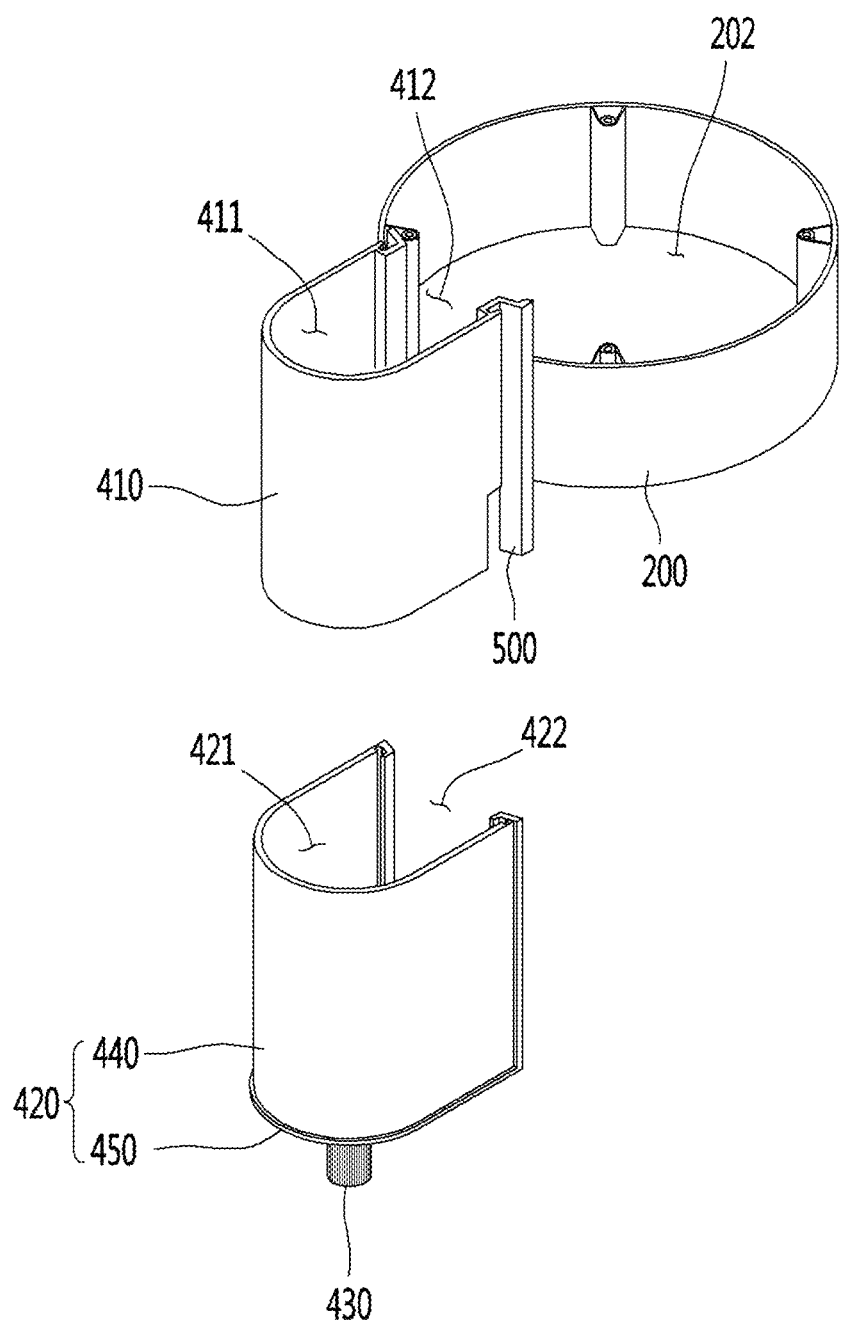
FIG. 6 is an exploded perspective view of a water-outlet module as one component of the present disclosure.
Figure 7:
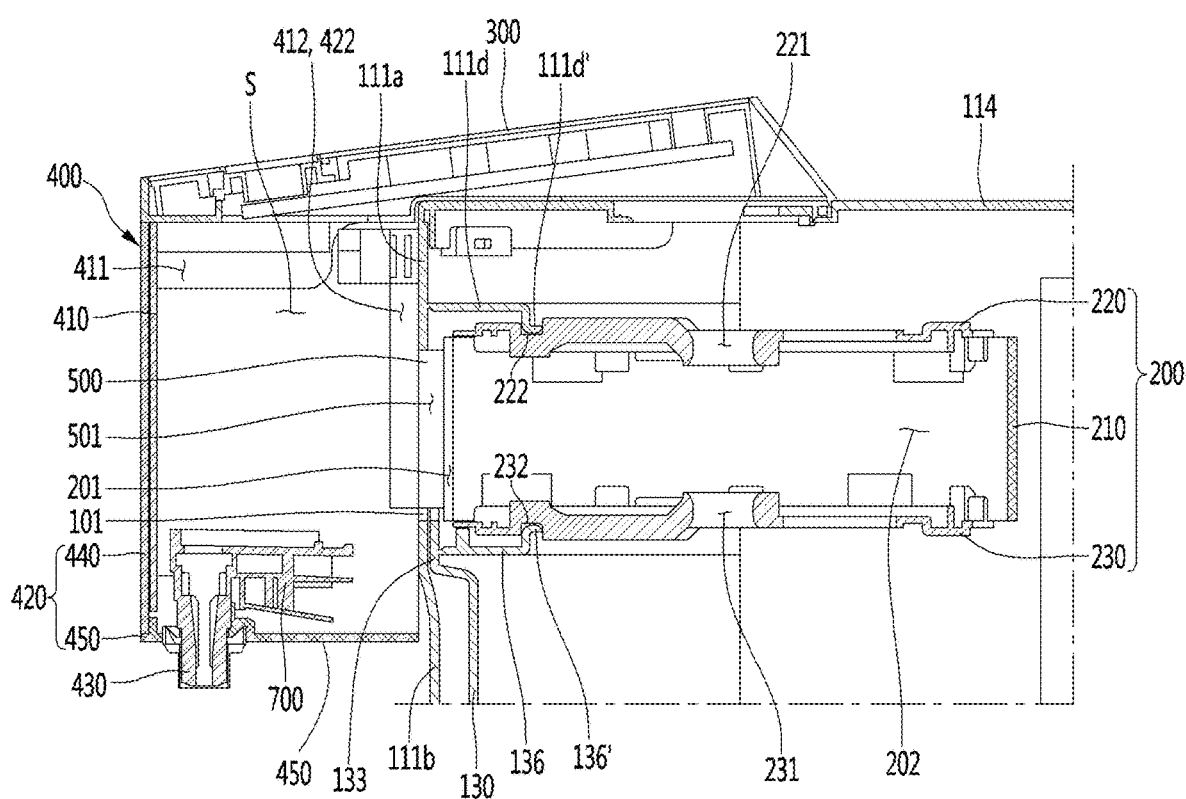
FIG. 7 is a vertical cross-sectional view of the purification device according to one embodiment of the present disclosure.
Figure 8:
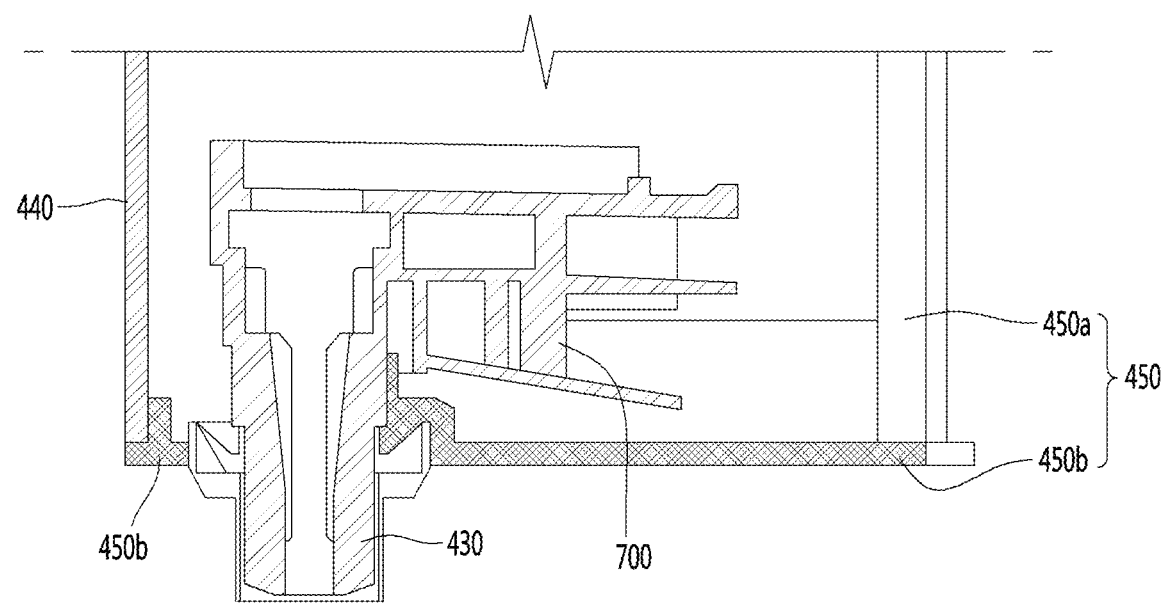
FIG. 8 is a vertical cross-sectional view of the vertically-movable cover in FIG. 7.

Hereinafter, the water-outlet module, which is a main component of the present disclosure, is illustrated. FIG. 6 is an exploded perspective view of the water-outlet module as a component of the present disclosure. FIG. 7 is a vertical cross-sectional view of the purification device according to one embodiment of the present disclosure. FIG. 8 is a vertical cross-sectional view of the vertically-movable cover in FIG. 7.

Referring to FIG. 6 to FIG. 8, the water-outlet module 400 may include the front-cover fixed cover 410, the vertically-movable cover 420, and the water-outlet nozzle 430. The fixed cover 410 is secured to the rotator 200 disposed within the main body 100 through the opening 101 defined in the front cover 111. The cover 410 protrudes forward of the main body 100, and the top of the cover 410 is connected to the bottom of the manipulation structure 300. The vertically-movable cover 420 is movable up and down while being supported by the fixed cover 410. The water-outlet nozzle 430 is mounted on the bottom of the vertically-movable cover 420.

The water-outlet nozzle 430 is coupled to the bottom of the vertically-movable cover 420. When the vertically-movable cover 420 ascends and descends along the fixed cover 410, the position (height) in the vertical direction of the water-outlet nozzle 430 may vary.

Since as described below, the fixed cover 410 is fixed to the rotator 200, the vertically-movable cover 420 and the water-outlet nozzle 430 connected to the fixed cover 410 may be varied in position in the horizontal direction. In this connection, the top of the fixed cover 410 is connected to the bottom of the manipulation structure 300.

According to this configuration, in a spacing B between the rotator 200 and the manipulation structure 300, an accommodation space S may be defined. The top of the vertically-movable cover 420 may be located in the accommodation space S provided between the rotator 200 and the manipulation structure 300 when the vertically-movable cover 420 is maximally raised.

The length of the vertically-movable cover 420 may be increased by the accommodation space S as described above. As a result, the maximum rise level of the water-outlet nozzle 430 coupled to the vertically-movable cover 420 and the vertically-movable cover 420 may be further higher. In addition, the maximum descending level of the water-outlet nozzle 430 coupled to the vertically-movable cover 420 and the vertically-movable cover 420 may be further lowered.

That is, the adjustable height variation of the water-outlet nozzle 430 coupled to the vertically-movable cover 420 and the vertically-movable cover 420 may be larger. When the top of the fixed cover 410 is connected to the bottom of the manipulation structure 300 as described above, the top of the water-outlet module 400 is primarily supported by the manipulation structure 300 relative to the main body 100. Further, by the rotator 200, the bottom or center of the module 400 may be secondarily supported relative to the main body 100.

Accordingly, the water-outlet module 400 may be more rigidly connected to the main body 100. When the water-outlet module 400 is rotated or lifted, the water-outlet module 400 may be prevented from vibrating. In this embodiment, the device may further include a bridge 500 connecting the rotator 200 and the water-outlet module 400.

The bridge 500 integrally connects the rotator 200 and the fixed cover 410. The bridge 500 passes through the opening 101. Both ends of the bridge are fixed to the rotator 200 and the fixed cover 410, respectively. When the water-outlet module 400 and the rotator 200 are rotated, the bridge 500 moves along the opening 101.

In this embodiment, the bridge 500, the tip of the rotator 200 to which the bridge 500 is connected, the back of the fixed cover 410, and the back of the vertically-movable cover 420 (right side of the drawing) may have respectively fluid channels 201, 412, 422, and 501 defined therein, through which a hose may pass. The channels may communicate with each other. When the fluid channels 201, 412, 422, and 501 are defined as described above, the inner space of the main body 100 and the inner space of the vertically-movable cover 420 may communicate with each other.

Accordingly, the hose 600 for supplying at least one of purified water, cold water, and hot water as generated from the main body 100 may be connected to the water-outlet nozzle 430 provided in the vertically-movable cover 420 via the fluid channels 201, 412, 422, and 501. In one example, the hose 600 may include a purified water pipe supplying purified water and cold water, and a hot water pipe supplying hot water. In this connection, the purified water pipe and the hot water pipe are made of a flexible material such as rubber, silicone, or the like, and may be bent or flattened. Thus, the pipe may be adapted to the vertical-movement movement of the vertically-movable cover 420.

When the vertically-movable cover 420 and the water-outlet nozzle 430 are lifted and lowered, the hose 600 may be adapted to the vertical movement of the vertically-movable cover 420, while bending or expanding, within the inner space 421 of the vertically-movable cover 420. Thus, regardless of the height of the vertically-movable cover 420 and the water-outlet nozzle 430, the cold water, purified water and hot water may be supplied to the water-outlet nozzle 430.

Referring again to FIG. 2 to FIG. 8, a vertically-movable cover 420 may act as an outer cover, while the fixed cover 410 may act as an inner cover disposed within the vertically-movable cover 420. Specifically, the vertically-movable cover 420 has a vertical-movement enabling space defined therein. The fixed cover 410 is received within the vertical-movement enabling space defined within the vertically-movable cover 420.

Accordingly, the vertically-movable cover 420 may be vertically moved while contacting and supporting the outer face of the fixed cover 410. Accordingly, the vertical level of the water-outlet nozzle 430 may be varied. That is, the vertically-movable cover 420 is provided on the outer side face of the fixed cover 410. When the vertically-movable cover 420 descends, the fixed cover 410 is gradually exposed to the outside. When the vertically-movable cover 420 rises, the fixed cover 410 is gradually inserted into the vertically-movable cover 420. In one example, when the vertically-movable cover 420 is at its maximum elevation, the fixed cover 410 may be completely housed inside the vertically-movable cover 420.

When the user holds the vertically-movable cover 420 in a state where the vertically-movable cover 420 has been elevated up as described above and pulls the cover 410 downward, the vertically-movable cover 420 is lowered while being held in contact with the fixed cover 410, whereby the fixed cover 410 is exposed to the outside.

Conversely, when the user pushes the vertically-movable cover 420 upward in a state where the vertically-movable cover 420 has been lowered down, the fixed cover 410 is housed inside the vertically-movable cover 420, and the vertically-movable cover 420 is lifted up. In this way, the vertically-movable cover 420 moves vertically such that the vertical level of the water-outlet nozzle 430 fixed to the vertically-movable cover 420 may vary.

In one example, the appearance of the vertically-movable cover 420 may be shaped to correspond to the shape of the fixed cover 410. In one embodiment, at least a portion of each of the fixed cover 410 and the vertically-movable cover 420 may have an arc-shaped cross-section, or may have a circular cross-section.

In another example, each of the fixed cover 410 and the vertically-movable cover 420 may have at least a portion of a straight cross-section. Alternatively, each of the fixed cover 410 and the vertically-movable cover 420 may have various cross-sectional shapes.

Although not shown, the fixed cover has a vertical-movement enabling space defined therein. While the vertically-movable cover is accommodated in the vertical-movement enabling space provided in the fixed cover, the movable cover vertically moves to vary the vertical level of the water-outlet nozzle.

That is, while the vertically-movable cover is accommodated in the fixed cover, the movable cover may vertically move downward through an opened bottom portion of the fixed cover and protrudes below and out of the fixed cover. In this connection, the removable cover as described later may be provided on the fixed cover or on the vertically-movable cover.

Referring again to FIG. 3, with the vertically-movable cover 420 being lowered, the fixed cover 410 may be exposed to the outside. Further, a space between the vertically-movable cover 420 and the fixed cover 410 may be exposed to the outside. In this state, the space between the fixed cover 410 and the vertically-movable cover 420 and the fixed cover 410 may be contaminated.

In one example, a user may pour coffee on the device, etc., and dust may accumulate on the device over time. In addition, various foreign substances may be introduced into the space. As a result, the bottom of the fixed cover 410 as not exposed to the outside, and the inside of the vertically-movable cover 420 as not exposed to the outside may be continuously kept in a contaminated state.

In addition, the water-outlet nozzle 430 as well as various valves and piping as disposed inside the vertically-movable cover 420 may be also be continuously left in a contaminated state. Moreover, there is a problem that inspection and repair including various parts provided inside the vertically-movable cover 420 may not proceed easily, irrespective of whether or not they are contaminated. Thus, according to the present disclosure, at least a portion of the fixed cover 410 or the vertically-movable cover 420 may be easily removed to solve the above problems.

In one embodiment, the vertically-movable cover 420 includes a removable cover (or cover wall) 440 that is detachable in a direction intersecting the vertical movement direction (vertical direction) of the vertically-movable cover 420. Specifically, the removable cover 440 may be separated in the forward and backward directions.

When the removable cover 440 is separated in the forward and backward directions as described above, the removable cover 440 may not be separated when the removable cover 440 is subjected to an upward pushing force or a downward pulling force during the course of vertically moving the vertically-movable cover 420.

Figure 9:
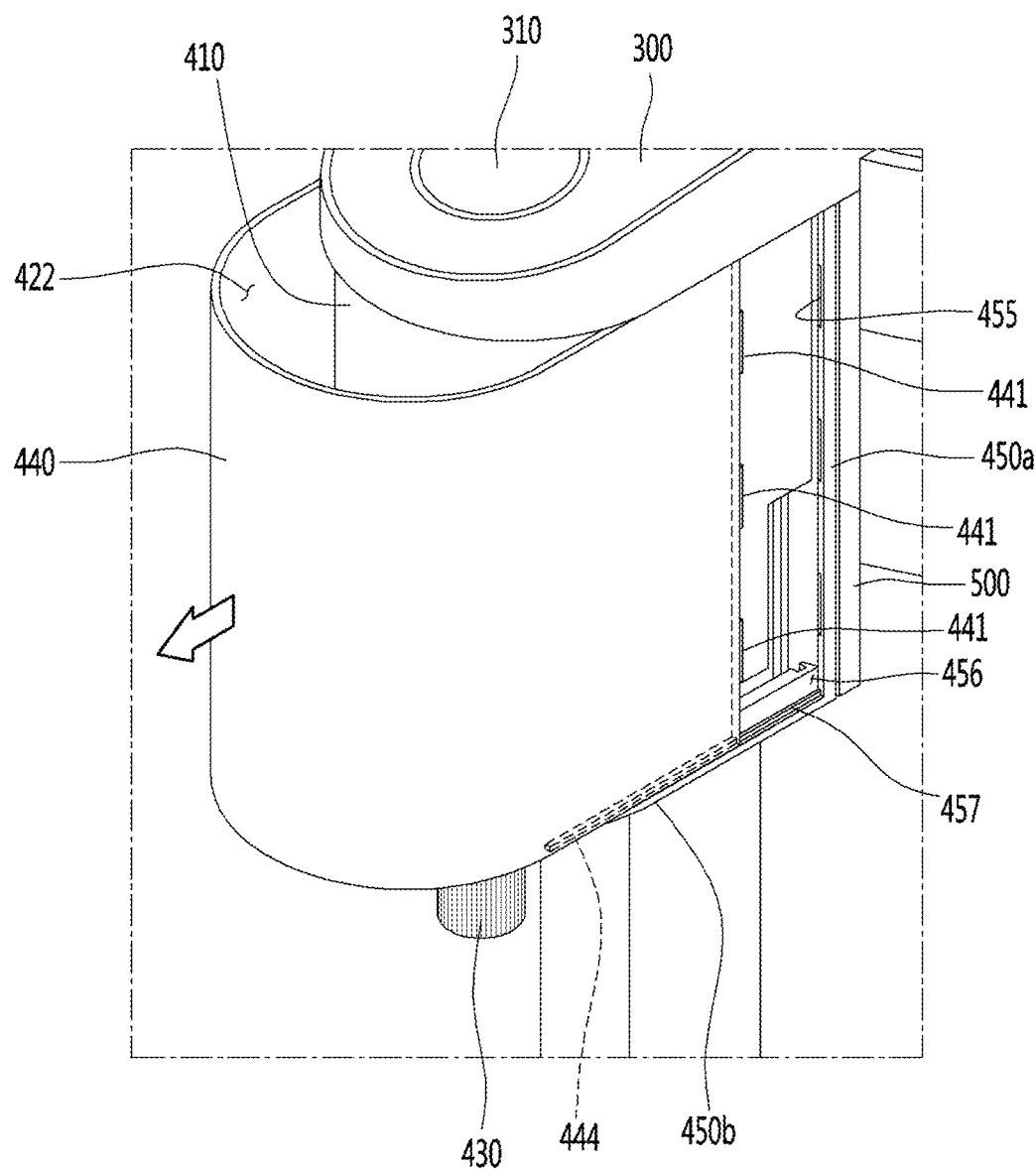
FIG. 9 is a perspective view showing a removable cover being separated from the vertically-movable cover as one component of the present disclosure.
Figure 10:
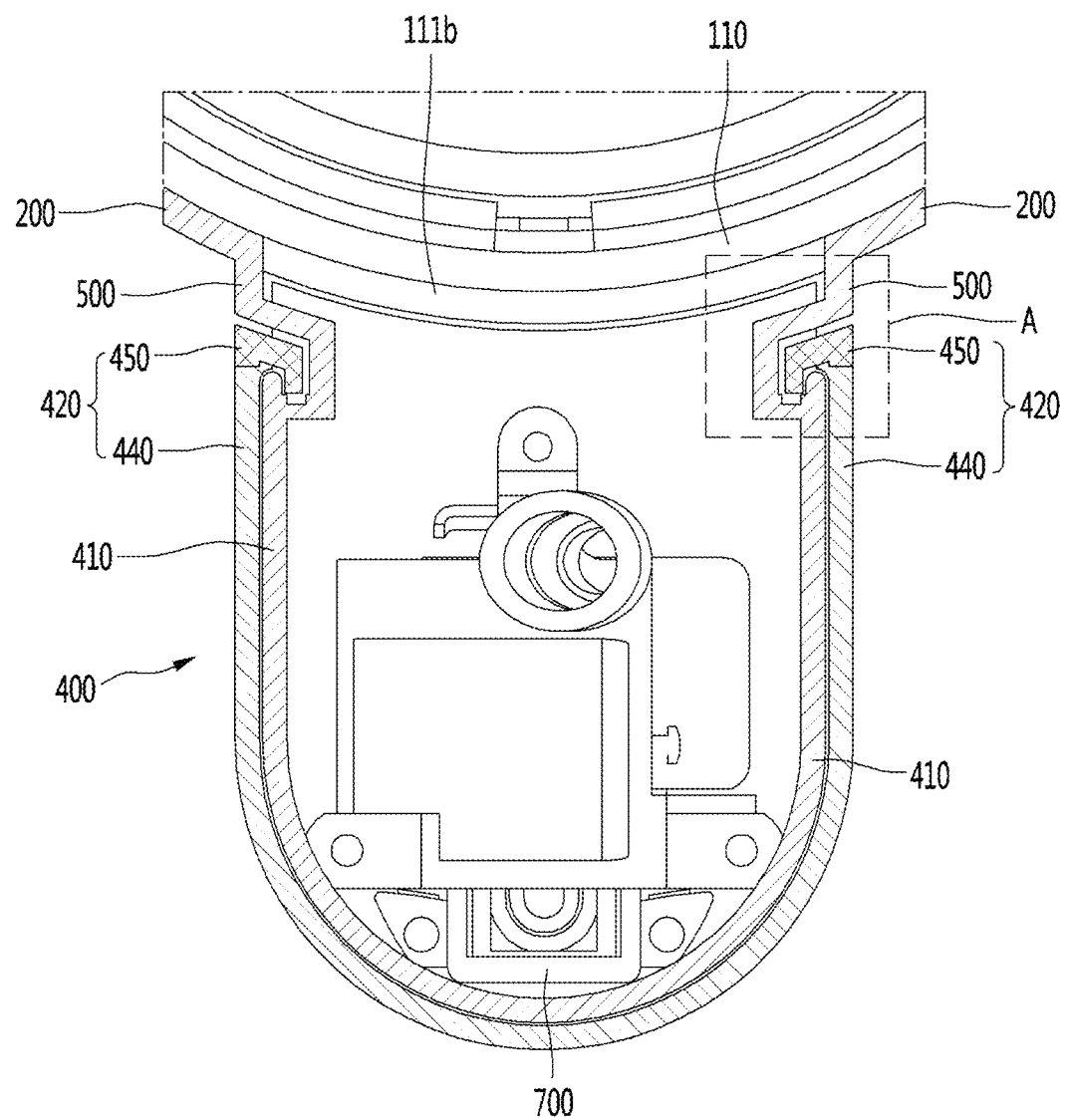
FIG. 10 is a horizontal cross-sectional view of the water-outlet module as one component of the present disclosure.
Figure 11:
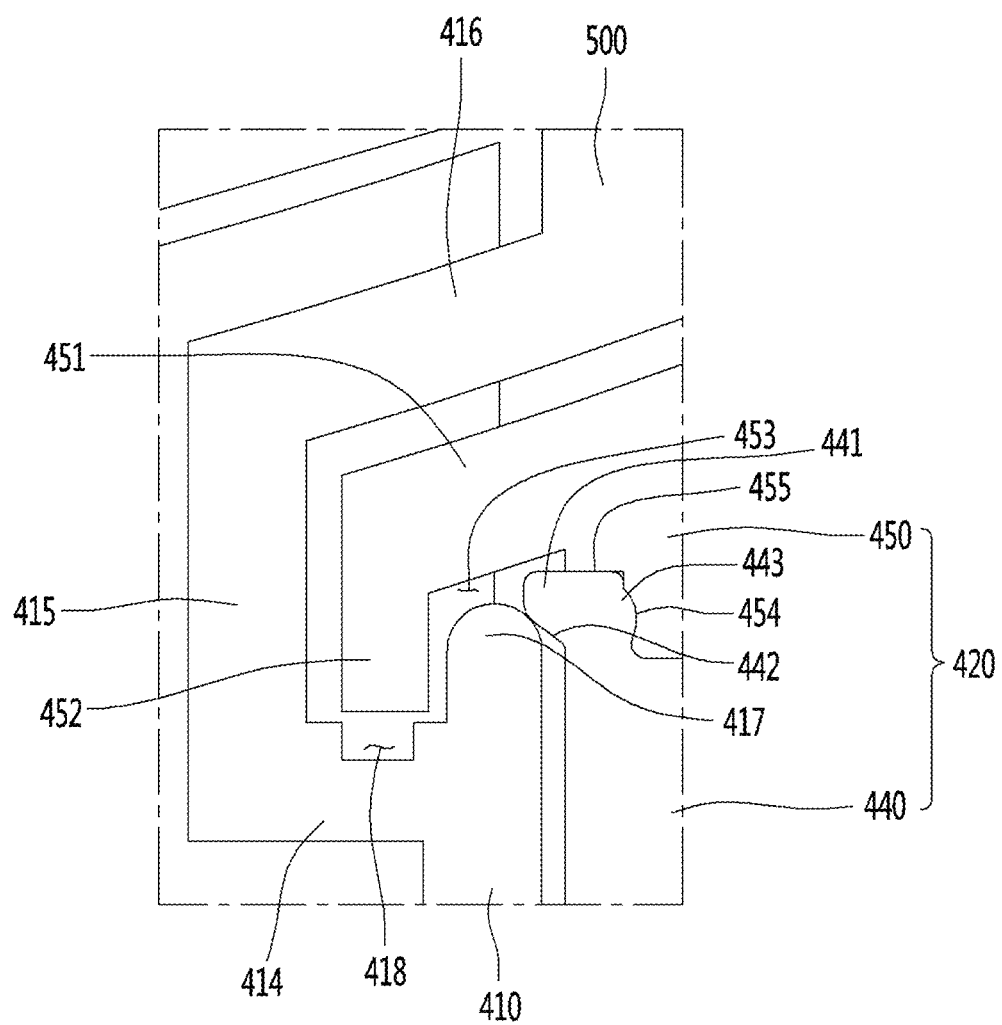
FIG. 11 is an enlarged view of a region A of FIG. 10.

FIG. 9 is a perspective view showing a removable cover being separated from the vertically-movable cover as one component of the present disclosure. FIG. 10 is a horizontal cross-sectional view of the water-outlet module as one component of the present disclosure. FIG. 11 is an enlarged view of a region A of FIG. 10. Referring to FIGS. 9 to 11, the vertically-movable cover 420 includes a vertically-movable frame 450. The vertically-movable frame 450 has an opening 422. The opening 42 is defined in at least a portion of the front-face or lateral faces of the frame 450. The vertically-movable frame 450 bears against the fixed cover 410. The water-outlet nozzle 430 is installed on the bottom face of the vertically-movable frame 450. The removable cover 440 opens and closes the opening 422.

In one example, the opening 422 may be formed by opening both the front face and both lateral faces of the vertically-movable cover 420. Thus, when the removable cover 440 is separated from the vertically-movable frame 450, the opening 422 may be open such that the front-face and both lateral faces of the vertically-movable cover 420 may be opened.

Conversely, when the removable cover 440 is attached to the vertically-movable frame 450, the opening 422 is blocked such that the front-face and both lateral faces of the vertically-movable cover 420 are blocked. Thus, when the opening 422 needs to be opened for maintenance work involving internal inspection or cleaning, etc., the user separates the removable cover 440 from the vertically-movable frame 450. The user may then proceed to inspect and clean the vertically-movable cover 420 through the open opening 422. In addition, the user may clean the space between the vertically-movable cover 420 and the fixed cover 410.

After the internal inspection and cleaning are completed, the user attaches the removable cover 440 to the vertically-movable frame 450 to block the opening 422. In one embodiment, as described above, in order for the removable cover 440 to be detached and attached from and to the vertically-movable frame 450, removing means should be provided at a contact portion between the removable cover 440 and the vertically-movable frame 450. In this connection, while the vertically-movable frame 450 is vertically moved linearly along the fixed cover 410, the frame 450 bears against the fixed cover 410.

Hereinafter, a removal structure between the removable cover 440 and the vertically-movable frame 450, and a connection structure between the vertically-movable frame 450 and the fixed cover 410 will be described. In one example, the fixed cover 410 has a U-shaped cross-section, and rear ends on both sides thereof are connected to the main body 100.

In this connection, the fixed cover 410 includes following extensions: a first extension 414 extending inwardly from each of the rear ends of the both sides of the fixed cover 410; a second extension 415 extending rearward from the end of the first extension 414; and a third extension 416 extending outwardly from the end of the second extension 415, wherein the third extension 416 is connected to the rotator 200 rotatably installed in the main body 100 via the bridge 500.

The first extension 414, the second extension 415, and the third extension 416 together define an angled C shape generally. Accordingly, each of the rear ends on both sides of the fixed cover 410 may have a cavity defined inwardly concavely therein to accommodate fourth and fifth extensions 451 and 452 to be described later.

In addition, in the rear-face of the first extension 414, a first concave groove 418 may be defined. On the end of the fifth extension 452, which will be described later, an auxiliary protrusion (not shown) may be formed, which is at least partially fitted in the first groove 418. With this configuration, the vertically-movable frame 450 may be more securely fixed to the fixed cover 410.

In one example, the third extension 416 and the fourth extension 451 each extend to correspond to the shape of the front-face of the main body 100 and the rotator 200. That is, the third extension 416 and the fourth extension 451 each extend to be inclined or bent such that a front end of each of the third extension 416 and the fourth extension 451 is positioned more inwardly than a rear end thereof.

In addition, a first protrusion 417 protruding rearward in parallel with the second extension 415 may be formed at an outer end of the first extension 414. Due to such a configuration, the fourth extension 451 and the fifth extension 452 described later may be more reliably connected to the first extension 414, the second extension 415, the third extension 416, and the first protrusion 417.

As described above, the vertically-movable cover 420 includes the fourth extension 451 and the fifth extension 452. The fourth extension 451 extends inwardly from each of the rear ends on both sides of the vertically-movable frame 450 and is inserted into the space between the first extension 414 and the third extension 416. The fifth extension 452 extends forward from the end of the fourth extension 451 and is inserted into the space between the first protrusion 417 and the second extension 415.

In this case, the fourth extension 451 and the fifth extension 452 may extend inwardly successively from each of the rear ends on both sides of the vertically-movable frame 450, thereby to define a bent combination. The combination may be sandwiched between the first extension 414 and the third extension 416 formed on each of the rear ends of the fixed cover 410 and between the first protrusion 417 and the second extension 415 formed on each of the rear ends of the fixed cover 410. Accordingly, in a state where the vertically-movable frame 450 is fitted in the fixed cover 410, the frame 450 is not shaken or separated in the horizontal direction, but vertical movement in the vertical direction of the frame 450 is available. That is, the vertically-movable frame 450 may be fixed to the fixed cover 410 so that the vertically-movable frame 450 may only perform vertical movement.

In one embodiment, the removable cover 440 has a U-shaped cross-section. The cover 440 has a stopping protrusion 441 projecting inwardly from each of the rear ends on both sides thereof. The stopping protrusion 441 may be inserted into the space between the first protrusion 417 and the fourth extension 451. Due to such a configuration, the removable cover 440 may be fixed between the vertically-movable frame 450 and the fixed cover 410. In addition, while the removable cover 440 may bear against the fixed cover 410, the removable cover 440 may move vertically together with the vertically-movable frame 450.

In addition, the stopping protrusion 441 includes a fixing protrusion 443 protruding outward from an outer face facing the inner face of the vertically-movable frame 450. The vertically-movable frame 450 may have a seat groove 454 defined in its inner face for receiving the fixing protrusion 443 therein. In this connection, each of the fixing protrusion 443 and the seat groove 454 may have a curved section. In one example, each of the fixing protrusion 443 and the seat groove 454 may be semicircular.

Due to such a configuration, the coupling force between the removable cover 440 and the vertically-movable frame 450 may be further improved. In addition, the vertically-movable frame 450 has a shoulder 455 formed on each of the rear ends on both sides. The shoulder 455 is recessed from the front to the back of the rear end of the frame so that at least a portion of the stopping protrusion 441 is seated on the shoulder 455. The rear-face of the stopping protrusion 441 is seated on the inner face of the shoulder 455.

Thus, when the removable cover 440 is fitted with the vertically-movable frame 450, the rear-face of the stopping protrusion 441 is caught on the shoulder 455, and, at the same time, the stopping protrusion 441 is inserted into the space between the first protrusion 417 and the fourth extension 451, thereby to generate a primary fixing force. Further, a secondary fixing force may be secured by the fixing protrusion 443 being inserted into the seat groove 454.

In addition, a cross-section of at least a portion of the vertically-movable frame 450 onto which the stopping protrusion 441 and the fixing protrusion 443 enter and contact may be curved. Thus, entrance of the stopping protrusion 441 and fixing protrusion 443 may be facilitated.

Similarly, a cross-section of at least a portion of the removable cover 440 onto which the vertically-movable frame 450 enters and contacts may be curved. In this embodiment, the stopping protrusion 441 formed on each of both ends of the removable cover 440 may include a plurality of stopping protrusions spaced apart from each other along the vertical direction.

To the contrary, the seat groove 454 and the shoulder 455 formed on each of both sides of the vertically-movable frame 450 may be continuously formed along the vertical direction. With this configuration, regardless of a position where the fastening between the removable cover 440 and the vertically-movable frame 450 takes place, this fastening may be facilitated.

In one embodiment, the first protrusion 417 may have a curved end. In one example, the first protrusion 417 may have a semicircular shape at its end. In addition, the face of the stopping protrusion 441 that contacts the first protrusion 417 may be formed obliquely. That is, the face of the stopping protrusion 441, which is in contact with the first protrusion 417, may be formed as an inclined face 442. With such a configuration, the stopping protrusion 441 may be smoothly fitted with and separated from the first protrusion 417 and the fourth extension 451. As a result, the removable cover 440 may be more easily attached to and detached from the vertically-movable frame 450.

In one embodiment, the vertically-movable frame 450 includes a pair of vertical portions (or vertical edges) 450a. The pair of vertical portions 450a are respectively formed at the rear ends on both sides of the frame 450, and extend in the vertical direction, and are horizontally spaced from each other. The vertically-movable frame 450 includes a horizontal portion (or horizontal edge) 450b. The horizontal portion 450b is connected to the bottom of the vertical portion 450a and is formed to be convex forward. The horizontal portion 450b has a bottom face onto which the water-discharge nozzle 430 is fixed.

The horizontal portion 450b has a horizontally-recessed recess 456 which is inwardly recessed in the outer face thereof. The recess 456 may be defined in the circumferential direction of the portion 450b. Accordingly, the horizontal portion has a stepped cross section.

With the above configuration of the horizontally-recessed 456, when the removable cover 440 is attached to the vertically-movable frame 450, the outer edge of the horizontal portion 450b and the outer face of the removable cover 440 may be flush with each other without forming a step. Furthermore, the bottom of the removable cover 440 may bear against the vertically-movable frame 450. Furthermore, since the mounting position of the removable cover 440 is visually confirmed, the removable cover 440 may be easily mounted.

In addition, the inner corner of the horizontally-recessed 456 defines a guide protrusion 457. In the bottom of the inner face of the removable cover 440, a guide groove 444 for receiving the guide protrusion 457 is formed. With this configuration, when the removable cover 440 is fitted with the vertically-movable frame 450, the front-to-back movement of the removable cover 440 may be guided in a straight line. In addition, when the removable cover 440 is separated from the vertically-movable frame 450, the rearward to frontward movement of the removable cover 440 may also be guided in a straight line.

According to aspects the present disclosure, the vertical level of the water-outlet nozzle can be freely adjusted. Furthermore, the user can easily separate at least a portion of the vertically-movable cover with the water-outlet nozzle.

In addition, during the vertical movement of the water-outlet module, the removable cover is not separated by the force as applied to the water-outlet module, which may enhance the user's convenience. Furthermore, the inspection and cleaning of the interior of the vertically-movable cover, and the inspection and cleaning of the space between the vertically-movable cover and the fixed cover, may be done easily. In addition, foreign matter may not enter between the vertically-movable cover and the fixed cover, thereby facilitating the vertical movement manipulation of the vertically-movable cover. Thus, there is an advantage that a problem that the sense of manipulation felt by the user is reduced may be prevented in advance.

Aspects the present disclosure provide a purification device to freely adjust the vertical level of the water-outlet nozzle. Moreover, aspects of the present disclosure provide a purification device in which the user may easily separate at least a portion of the vertically-movable cover with the water-outlet nozzle.

In addition, aspects of the present disclosure provide a purification device in which during the vertical movement of the water-outlet module, a removable cover is not separated via the force applied to the water-outlet module, thereby enhancing the user's convenience. In addition, aspects of the present disclosure provide a purification device in which inspection and cleaning of the interior of the vertically-movable cover, and of the space between the vertically-movable cover and the fixed cover may be done easily.

In addition, aspects of the present disclosure provide a purification device in which an inner space in the vertically-movable cover and a space between the vertically-movable cover and the fixed cover may be hygienically managed. In addition, aspects of the present disclosure provide a purification device in which the user can visually confirm the sanitary condition of the inside of the vertically-movable cover, thereby relieving the anxiety felt by the user.

In addition, aspects of the present disclosure provide a purification device in which foreign matter may be prevented from flowing into between the vertically-movable cover and the fixed cover, thus allowing easy manipulation of the vertically-movable cover by the user and, thus, improving the feeling of manipulation felt by the user. Furthermore, aspects of the present disclosure provide a purification device in which a design of the water-outlet module may be easily modified according to the user's choice.

Furthermore, aspects of the present disclosure provide a purification device in which the position of the water-outlet nozzle may be freely adjusted while rotating the water-outlet nozzle. In addition, aspects of the present disclosure provide a purification device in which the manipulation unit may be rotated together with the water-outlet nozzle, thereby to ensure ease of manipulation.

In one aspect, a purification device may comprise: a main body; and a water-outlet module including: a fixed cover fixed to the main body so as to protrude forward of the main body; a vertically-movable cover to move up and down while bearing against the fixed cover; and a water-outlet nozzle mounted on a bottom of the vertically-movable cover, wherein the vertically-movable cover or the fixed cover includes a removable cover configured to be removable in a direction crossing a vertical movement direction of the vertically-movable cover.

In one implementation of the purification device, the fixed cover is received within the vertically-movable cover, wherein the fixed cover protrudes above and out of the vertically-movable cover when the vertically-movable cover moves vertically. In one implementation of the purification device, the removable cover is included in the vertically-movable cover.

In one implementation of the purification device, the vertically-movable cover includes a vertically-movable frame configured to move up and down while the vertically-movable frame bears against the fixed cover, wherein the vertically-movable frame has an opening defined in at least a portion of a front-face or lateral faces of the frame such that the fixed cover received in the vertically-movable cover is exposed to an outside, wherein the removable cover opens and closes the opening.

In one implementation of the purification device, the fixed cover includes: a first extension extending inwardly from each of rear ends of both sides of the fixed cover; a second extension extending rearward from an end of the first extension; and a third extension extending outwardly from an end of the second extension and connected to the main body.

In one implementation of the purification device, the first extension has a first groove defined in a rear-face thereof. In one implementation of the purification device, the first extension has a first protrusion protruding rearward from an outer face thereof in parallel with the second extension.

In one implementation of the purification device, the vertically-movable cover includes: a fourth extension extending inwardly from a rear end of the vertically-movable cover and inserted into between the first extension and the third extension; and a fifth extension extending forward from an end of the fourth extension and inserted into between the first protrusion and the second extension.

In one implementation of the purification device, the removable cover has a stopping protrusion protruding inwardly from a rear end thereof, wherein the stopping protrusion is inserted into between the first protrusion and the fourth extension. In one implementation of the purification device, the stopping protrusion includes a fixing protrusion protruding outward from an outer face thereof facing an inner face of the vertically-movable cover, wherein the vertically-movable cover has a seat groove defined in an inner face thereof for receiving the fixing protrusion.

In one implementation of the purification device, the vertically-movable cover has a shoulder recessed rearwards in an inner face thereof, wherein the shoulder is in contact with a rear-face of the stopping protrusion. In one implementation of the purification device, the first protrusion has a curved end.

In one implementation of the purification device, the stopping protrusion has an inclined face contacting the first protrusion. In one implementation of the purification device, the vertically-movable frame includes: first and second vertical portions respectively formed at rear ends of both sides of the frame, wherein the vertical portions extend in a vertical direction, and are horizontally spaced from each other; and a horizontal portion connected to a bottom of each of the first and second vertical portions, and formed to be convex forwards.

In one implementation of the purification device, the horizontal portion has a horizontally-recess recessed inwardly in an outer face thereof. In one implementation of the purification device, an inner corner of the horizontally-recess defines a guide protrusion, wherein the removable cover has a guide groove in a bottom of an inner face thereof for receiving the guide protrusion therein.

In accordance with aspects of the present disclosure, the vertical level of the water-outlet nozzle may be freely adjusted. Moreover, in accordance with aspects of the present disclosure, the user may easily separate at least a portion of the vertically-movable cover with the water-outlet nozzle.

In addition, in accordance with aspects of the present disclosure, during the vertical movement of the water-outlet module, a removable cover is not separated via the force applied to the water-outlet module, thereby enhancing the user's convenience. In addition, in accordance with aspects of the present disclosure, inspection and cleaning of the interior of the vertically-movable cover, and of the space between the vertically-movable cover and the fixed cover may be done easily.

In addition, in accordance with aspects of the present disclosure, an inner space in the vertically-movable cover and a space between the vertically-movable cover and the fixed cover may be hygienically managed. In addition, in accordance with aspects of the present disclosure, the user can visually confirm the sanitary condition of the inside of the vertically-movable cover, thereby relieving the anxiety felt by the user.

In addition, in accordance with aspects of the present disclosure, foreign matter may be prevented from flowing into between the vertically-movable cover and the fixed cover, thus allowing easy manipulation of the vertically-movable cover by the user and, thus, improving the feeling of manipulation felt by the user. Furthermore, in accordance with aspects of the present disclosure, a design of the water-outlet module may be easily modified according to the user's choice.

Furthermore, in accordance with aspects of the present disclosure, the position of the water-outlet nozzle may be freely adjusted while rotating the water-outlet nozzle. In addition, in accordance with aspects of the present disclosure, the manipulation unit may be rotated together with the water-outlet nozzle, thereby to ensure ease of manipulation.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present disclosure.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the present disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment of the present disclosure. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A device comprising:
  a main body; and
  an outlet, the outlet including:
    a first cover that is fixed to the main body and protrudes forward of the main body;
    a second cover that is vertically movable in a first direction while bearing against the first cover; and
    a nozzle mounted on a bottom of the second cover, wherein the second cover includes a cover wall configured to be removable in a second direction crossing the first direction,
wherein the first cover is received with the second cover, and the first cover protrudes above and out of the second cover when the second cover moves vertically,
wherein the second cover includes a frame configured to move vertically while the frame bears against the first cover,
wherein the frame has an opening defined in at least a portion of a front-face or lateral faces of the frame such that a portion of the first cover that is received in the second cover is exposed,
wherein the cover wall opens and closes the opening, and
wherein the first cover includes:
    a first extension extending inwardly from each of rear ends of sides of the first cover;
    a second extension extending rearward from an end of the first extension; and
    a third extension extending outwardly from an end of the second extension and connected to the main body.

2. The device of claim 1, wherein the first extension has a first groove defined in a rear face thereof.

3. The device of claim 1, wherein the first extension has a first protrusion protruding rearward from an outer face thereof parallel to the second extension.

4. The device of claim 3, wherein the second cover includes:
    a fourth extension extending inwardly from a rear end of the second cover and inserted between the first extension and the third extension; and
    a fifth extension extending forward from an end of the fourth extension and inserted between the first protrusion and the second extension.

5. The device of claim 4, wherein the cover wall includes a stopping protrusion extending inwardly from a rear end thereof, and wherein the stopping protrusion is provided between the first protrusion and the fourth extension.

6. The device of claim 5, wherein the stopping protrusion includes a fixing protrusion protruding outward from an outer face thereof and facing an inner face of the second cover, and
    wherein the second cover included a seat groove defined in the inner face thereof to receive the fixing protrusion.

7. The device of claim 5, wherein the second cover includes a shoulder recessed rearwards in an inner face thereof, and wherein the shoulder is in contact with a rear face of the stopping protrusion.

8. The device of claim 5, wherein the first protrusion includes a curved end.

9. The device of claim 8, wherein the stopping protrusion includes an inclined face contacting the first protrusion.

10. The device of claim 1, wherein the frame includes:
    first and second vertical edges respectively formed at rear ends of sides of the frame, wherein the vertical portions extend in a vertical direction and are horizontally spaced from each other; and
    a horizontal edge connected to a bottom of each of the first and second vertical edges and formed to be convex forward.

11. The device of claim 10, wherein the horizontal edge includes a horizontal recess that is formed in an outer face thereof.

12. The device of claim 11, wherein an inner corner of the horizontal recess defines a guide protrusion, and wherein the cover wall includes a guide groove in a bottom of an inner face thereof to receive the guide protrusion therein.

13. A device comprising:
a main body; and
an outlet, the outlet including:
    a first cover that is fixed to the main body and protrudes forward of the main body;
    a second cover that receives the first cover, the second cover including a frame that is vertically movable relative to the first cover, and a cover wall that is removably coupled to the frame; and
    a nozzle mounted on a bottom of the frame,
wherein the first cover includes:
    a first extension extending inwardly from each of rear ends of sides of the first cover;
    a second extension extending rearward from an end of the first extension; and
    a third extension extending outwardly from an end of the second extension and connected to the main body.

14. The device of claim 13, wherein the second cover includes:
    a fourth extension extending inwardly from a rear end of the second cover and inserted between the first extension and the third extension; and
    a fifth extension extending forward from an end of the fourth extension and inserted between the first protrusion and the second extension.

15. The device of claim 14, wherein the cover wall includes a stopping protrusion extending inwardly from a rear end thereof, and wherein the stopping protrusion is provided between the first protrusion and the fourth extension.

16. A device comprising:
a main body; and
an outlet, the outlet including:
    a first cover that is fixed to the main body and protrudes forward of the main body;
    a second cover that is vertically movable in a first direction while bearing against the first cover; and
    a nozzle mounted on a bottom of the second cover,
wherein the second cover includes a cover wall configured to be removable in a second direction crossing the first direction,
wherein the first cover is received with the second cover, and the first cover protrudes above and out of the second cover when the second cover moves vertically,
wherein the second cover includes a frame configured to move vertically while the frame bears against the first cover,
wherein the frame has an opening defined in at least a portion of a front-face or lateral faces of the frame such that a portion of the first cover that is received in the second cover is exposed,
wherein the cover wall opens and closes the opening,
wherein the frame includes:
    first and second vertical edges respectively formed at rear ends of sides of the frame, wherein the vertical portions extend in a vertical direction, and are horizontally spaced from each other; and
    a horizontal edge connected to a bottom of each of the first and second vertical portions, and formed to be convex forwards,
wherein the horizontal edge includes a horizontal recess that is formed in an outer face thereof, wherein an inner corner of the horizontal recess defines a guide protrusion, and wherein the cover wall includes a guide groove in a bottom of an inner face thereof to receive the guide protrusion therein.

* * * * *